US011950075B2

(12) United States Patent
Zhang et al.

(10) Patent No.: US 11,950,075 B2
(45) Date of Patent: Apr. 2, 2024

(54) SOUNDING DEVICE

(71) Applicant: AAC Microtech (Changzhou) Co., Ltd., Changzhou (CN)

(72) Inventors: Pengfei Zhang, Shenzhen (CN); Wei Liu, Shenzhen (CN); Xudong Yan, Shenzhen (CN)

(73) Assignee: AAC Microtech (Changzhou) Co., Ltd., Changzhou (CN)

( * ) Notice: Subject to any disclaimer, the term of this patent is extended or adjusted under 35 U.S.C. 154(b) by 206 days.

(21) Appl. No.: 17/566,704

(22) Filed: Dec. 31, 2021

(65) Prior Publication Data

US 2023/0171548 A1 Jun. 1, 2023

(30) Foreign Application Priority Data

Dec. 1, 2021 (CN) ......................... 202111458522.2

(51) Int. Cl.

| | |
|---|---|
| ***H04R 9/06*** | (2006.01) |
| ***H04R 1/02*** | (2006.01) |
| ***H04R 7/16*** | (2006.01) |
| ***H04R 9/02*** | (2006.01) |
| ***H04R 9/04*** | (2006.01) |

(52) U.S. Cl.

CPC ............... *H04R 9/06* (2013.01); *H04R 1/026* (2013.01); *H04R 9/025* (2013.01); *H04R 9/046* (2013.01); *H04R 7/16* (2013.01); *H04R 2400/11* (2013.01)

(58) Field of Classification Search

CPC .......... H04R 1/2811; H04R 3/14; H04R 1/22; H04R 31/00; H04R 9/06; H04R 5/04; H04R 2400/03; H04R 5/033; H04R 9/043; H04R 9/025; H04R 1/026; H04R 9/046; H04R 7/16; H04R 2400/11; H04S 2400/07; Y10T 29/4908

USPC ......... 381/89, 150, 412, 413, 403, 409, 400, 381/404, 405, 189, 407, 152, 420, 396

See application file for complete search history.

(56) References Cited

U.S. PATENT DOCUMENTS

| | | | | |
|---|---|---|---|---|
| 2007/0025585 A1* | 2/2007 | Ikeda | H04R 9/04 | 381/403 |
| 2008/0216578 A1* | 9/2008 | Takashima | G06F 3/016 | 73/649 |
| 2012/0170794 A1* | 7/2012 | Kim | H04R 9/043 | 381/413 |

* cited by examiner

*Primary Examiner* — Carolyn R Edwards
*Assistant Examiner* — Julie X Dang
(74) *Attorney, Agent, or Firm* — W&G Law Group

(57) ABSTRACT

The present disclosure discloses a sounding device including a frame, a magnetic circuit system with a magnetic part and a vibration system. The vibration system includes a diaphragm fixed to the frame, a voice coil driving the diaphragm to vibrate and arranged around the magnetic part, and a metal shrapnel with conductive function. One end of the metal shrapnel is fixed to the frame and electrically connected to an external circuit, and the other end of the metal shrapnel is fixed to the voice coil and electrically connected to the lead wire of the voice coil. The metal shrapnel restrains a movement of the voice coil in a direction perpendicular to a vibration direction of the diaphragm. Compared with the related art, the sounding device disclosed by the present disclosure can reduce the number of elements to simplify the product structure.

9 Claims, 8 Drawing Sheets

A-A

SOUNDING DEVICE

FIELD OF THE PRESENT DISCLOSURE

The present disclosure relates to electroacoustic transducers, in particular to a sounding device.

DESCRIPTION OF RELATED ART

In order to adapt to the development of miniaturization and multi-functionalization of various audio equipment and information communication equipment, the sounding devices used in such equipment are required to correspondingly tend to be more miniaturized, so that the coordination of the sounding devices and other peripheral components is more compact. Especially with the demand for the development of light and thin mobile phones, the quality requirements for the sounding devices used therein are also getting higher and higher.

A sounding device in the related art includes a frame, a vibration system, and a magnetic circuit. The vibration system includes a diaphragm, and a voice coil for driving the diaphragm to vibrate. The sounding device in the related art not only needs to provide a suspension to effectively restrain the voice coil from swinging, but also needs to manually weld a braided wire and the voice coil lead wire during assembly to realize an electrical connection between the voice coil and an external circuit. However, this kind of sounding device is not only complicated in structure and includes many elements, but also is not conducive to the realization of the automatic assembly of the sounding device. If an FPC is used as a component to support the voice coil, it is difficult to restrain the voice coil from swinging due to the insufficient structural strength of the FPC, resulting in poor supporting effect.

Thus, it is necessary to provide a novel sounding device to solve the problem.

SUMMARY

An objective of the present disclosure is to provide a sounding device which has a better reliability.

In order to achieve the objective mentioned above, the present disclosure discloses a sounding device including a frame, a magnetic circuit system fixed to the frame, and a vibration system fixed to the frame. The magnetic circuit includes a magnetic part. The vibration system includes a diaphragm fixed to the frame, a voice coil driving the diaphragm to vibrate and arranged around the magnetic part, and a metal shrapnel with conductive function. The voice coil includes a lead wire. One end of the metal shrapnel is fixed to the frame and electrically connected to an external circuit, and the other end of the metal shrapnel is fixed to the voice coil and electrically connected to the lead wire of the voice coil. The number of the metal shrapnel is two, and the two metal shrapnels are respectively located on two opposite sides of the magnetic part. The metal shrapnel restrains a movement of the voice coil in a direction perpendicular to a vibration direction of the diaphragm.

Further, the metal shrapnel includes a first connecting portion fixedly connected to the voice coil, a welding portion extending from the first connecting portion and electrically connected to the lead wire of the voice coil, a second connecting portion apart from the first connecting portion and fixed to the frame, and an elastic arm connecting the first connecting portion and the second connection portion, the second connecting portion is electrically connected to the external circuit.

Further, the voice coil includes a first surface fixedly connected to the first connecting portion and a second surface opposite to the first surface, the first surface and the second surface are spaced apart along the vibration direction of the diaphragm.

Further, the lead wire of the voice coil is led out from the first surface.

Further, the second surface is fixedly connected to the diaphragm via a skeleton.

Further, at least two fixing holes are provided through the second connecting portion, and fixing posts passing through the fixing holes are provided on the frame.

Further, a position of the frame corresponding to the second connecting portion is penetrated with a window that partially exposes the second connecting portion, and the second connecting portion is electrically connected to the external circuit through the window.

Further, the magnetic circuit system includes a yoke fixed to the frame, the yoke includes s bottom wall fixed to the magnetic part, a side wall extending from an edge of the bottom wall toward the diaphragm, a magnetic gap is formed by the magnetic part and the side wall for receiving the voice coil, a gap is formed on the side wall for avoiding the welding portion and the elastic arm.

Further, the bottom wall protrudes toward the diaphragm for forming a protruding part, the magnetic part is fixed on the protruding part, and an orthographic projection of the protruding part on the magnetic part is located within a range of the magnetic part.

Further, the magnetic part includes a first magnet fixed on the bottom wall, a first pole plate stacked on a side of the first magnet away from the bottom wall, a second magnet stacked on a side of the first pole plate away from the first magnet, and a second pole plate stacked on a side of the second magnet away from the first magnet.

BRIEF DESCRIPTION OF THE DRAWINGS

Many aspects of the embodiments can be better understood with reference to the following drawings. The components in the drawing are not necessarily drawn to scale, the emphasis instead being placed upon clearly illustrating the principles of the present disclosure.

DETAILED DESCRIPTION OF THE EMBODIMENTS

Figure 1:
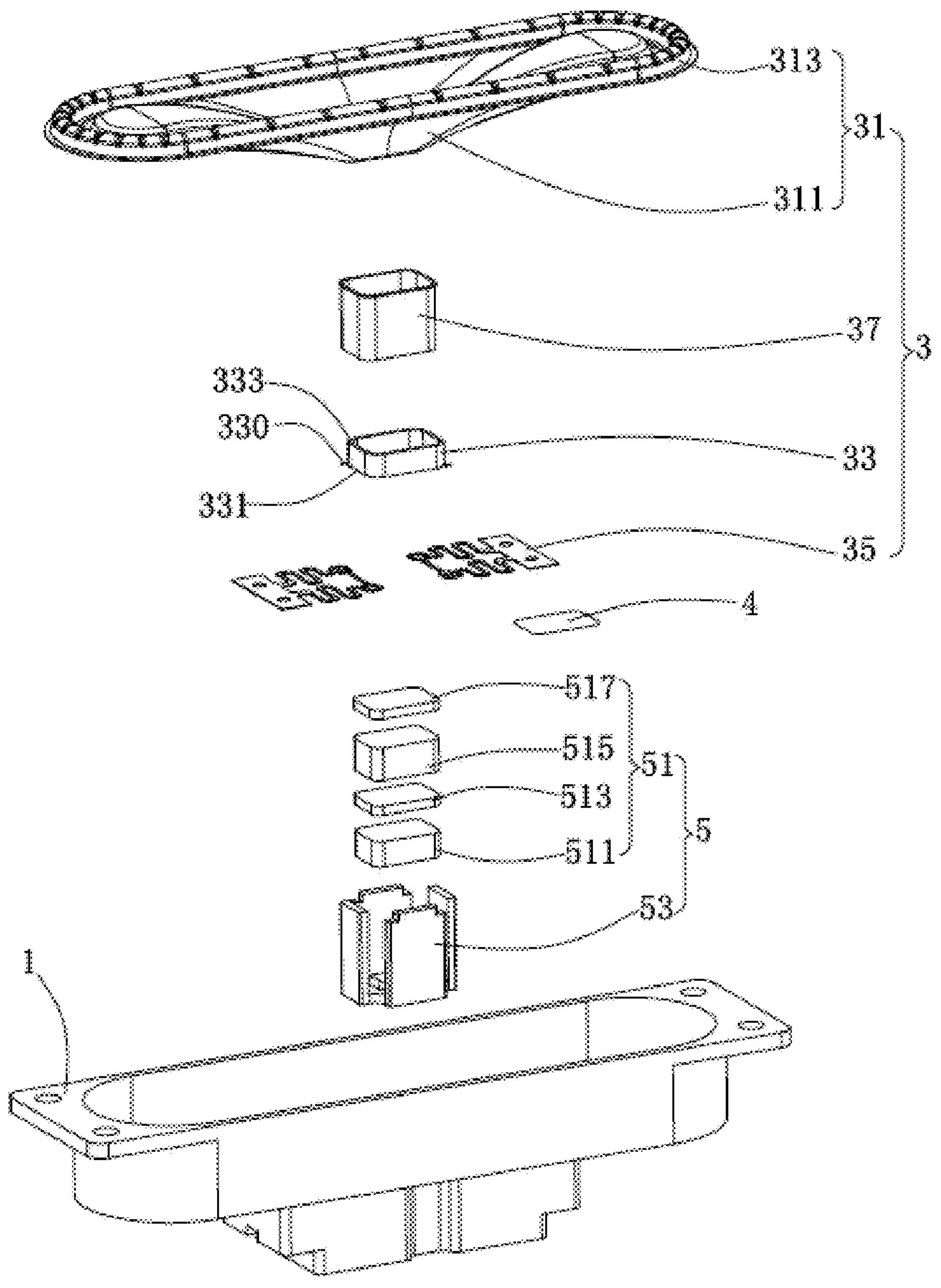
FIG. 1 is an exploded view of a sounding device in accordance with an exemplary embodiment of the present disclosure.

The present disclosure will hereinafter be described in detail with reference to the embodiments. To make the technical problems to be solved, and technical solutions and beneficial effects of the present disclosure more apparent, the present disclosure is described in further detail together with the figures and the embodiments. It should be understood the embodiments described hereby are only to explain the disclosure, not intended to limit the disclosure.

Referring to FIGS. 1-9, the present disclosure discloses a sounding device 100 including a frame 1, a vibration system 3 fixed to the frame 1, and a magnetic circuit system 5 fixed to the frame 1 for driving the vibration system 3 to vibrate and emit sound.

The magnetic circuit system 5 includes a magnetic part 51.

The vibration system 3 includes a diaphragm 31 fixed to the frame 1, a voice coil 33 driving the diaphragm 31 to vibrate, and a metal shrapnel 35 with conductive function. The voice coil 33 is arranged around the magnetic part 51. The voice coil 33 includes a lead wire 330, one end of the metal shrapnel 35 is fixed to the frame 1 and electrically connected to an external circuit 4, the other end of the metal shrapnel 35 is fixed to the voice coil 33 and electrically connected to the lead wire 330 of the voice coil 33. The number of the shrapnel 35 two, the two shrapnels are respectively located on two opposite sides of the magnetic part 51. After the external circuit 4 energizes the voice coil 33 through the metal shrapnel 35, the voice coil 33 is energized and vibrates under the action of the magnetic field of the magnetic part 51. Meanwhile, the vibration of the voice coil 33 drives the diaphragm 31 to vibrate and produce sound and drives the metal shrapnel 35 to vibrate in a vibration direction of the diaphragm 31, and during the vibration process of the voice coil 33, the metal shrapnel 35 restrains the movement of the voice coil 33 in a direction perpendicular to the vibration direction of the diaphragm 31, thereby preventing the voice coil 33 from swinging.

Optionally, the metal shrapnel 35 is made of a metal material. It should be noted that, in order to enable metal shrapnel 35 to restrain the movement of the voice coil 33 in the vibration direction perpendicular to the diaphragm 31, the metal shrapnel 35 needs to be arranged in the direction perpendicular to the vibration direction of the diaphragm 31 for achieving sufficient rigidity.

Figure 6:
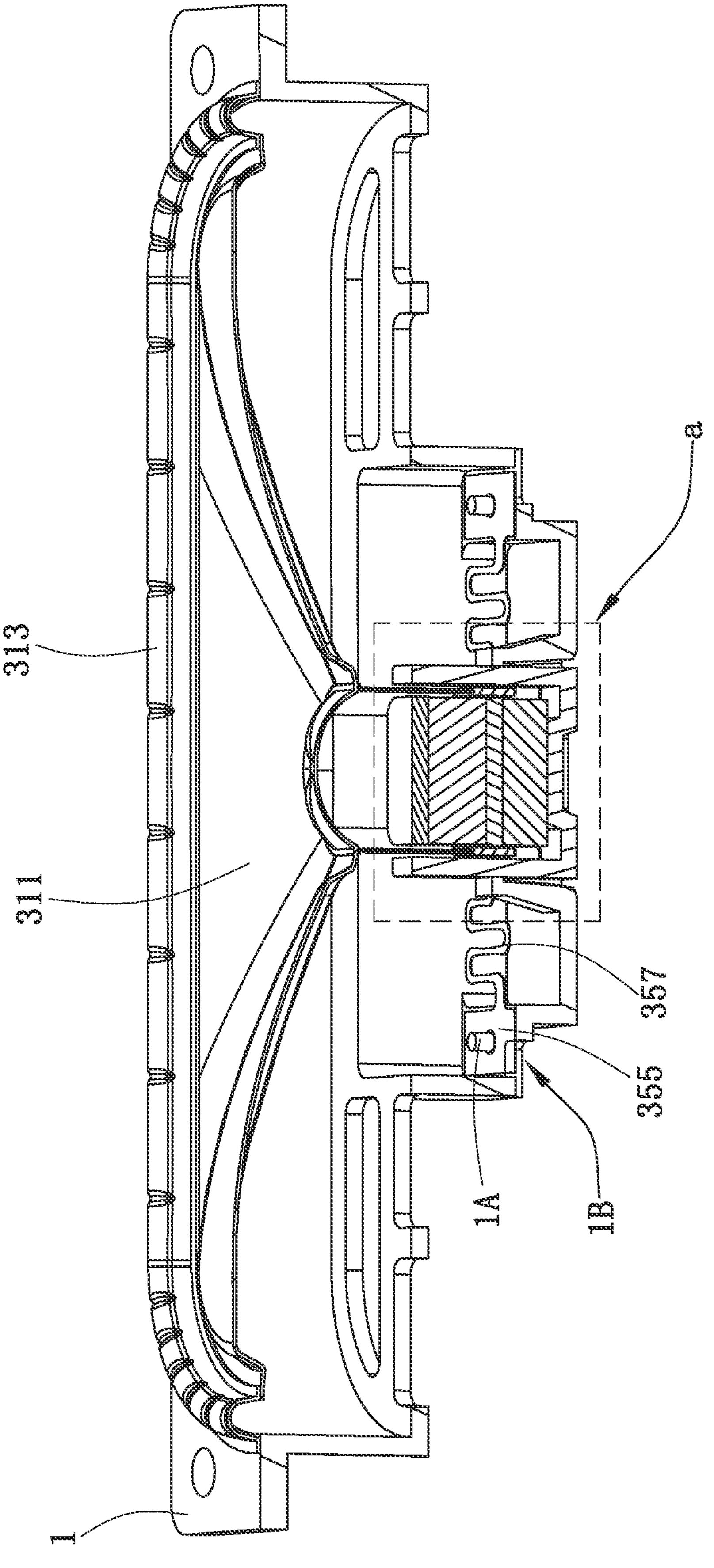
FIG. 6 is a cross-sectional view taken along a line A-A of FIG. 5.

Referring to FIG. 1 and FIG. 6, the diaphragm 31 includes a dome 311 and a suspension 313 around the dome 311, an outer edge of the suspension 313 is fixed to the frame 1, an inner edge of the suspension 313 is fixed to the dome 311 which is derived to vibrate by the voice coil 33. Further, the suspension 313 and the dome 311 are integrally formed or a split-type structure.

Referring to FIG. 6, the dome 311 protrudes towards to the magnetic circuit system 5. It can be understood that, in other embodiments, the dome 311 can also be in a flat shape.

Referring to FIG. 1, the voice coil 33 and the magnetic part 51 are overall in rectangular plate shapes, a pair of metal shrapnels 35 is respectively connected to two short sides of the voice coil 33. Understandably, in other embodiments, the voice coil 33 and the magnetic part 51 can also overall in a circular shape, accordingly, a pair of the metal shrapnels 35 is respectively connected to two opposite ends of a diameter of the voice coil 33.

The voice coil 33 includes a first surface 331 and a second surface 333 opposite to the first surface 331, the first surface 331 and the second surface 333 are spaced apart along a vibration direction of the diaphragm 31, the first surface 331 is fixedly connected to the metal shrapnel 35.

In the present embodiment, the lead wire 330 of the voice coil 33 is led out from the first surface.

Figure 7:
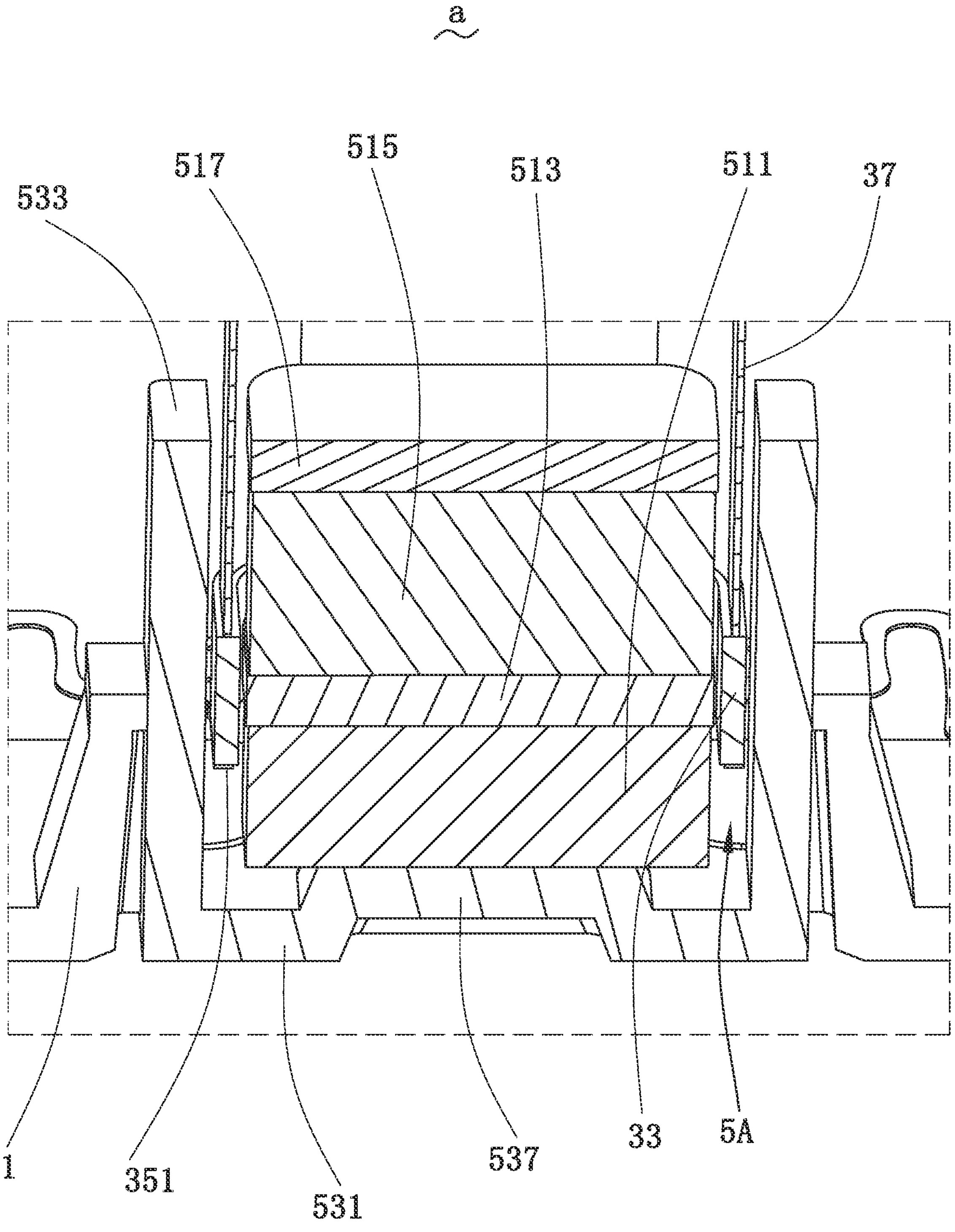
FIG. 7 is an enlarged view of Part a of FIG. 6.
Figure 9:
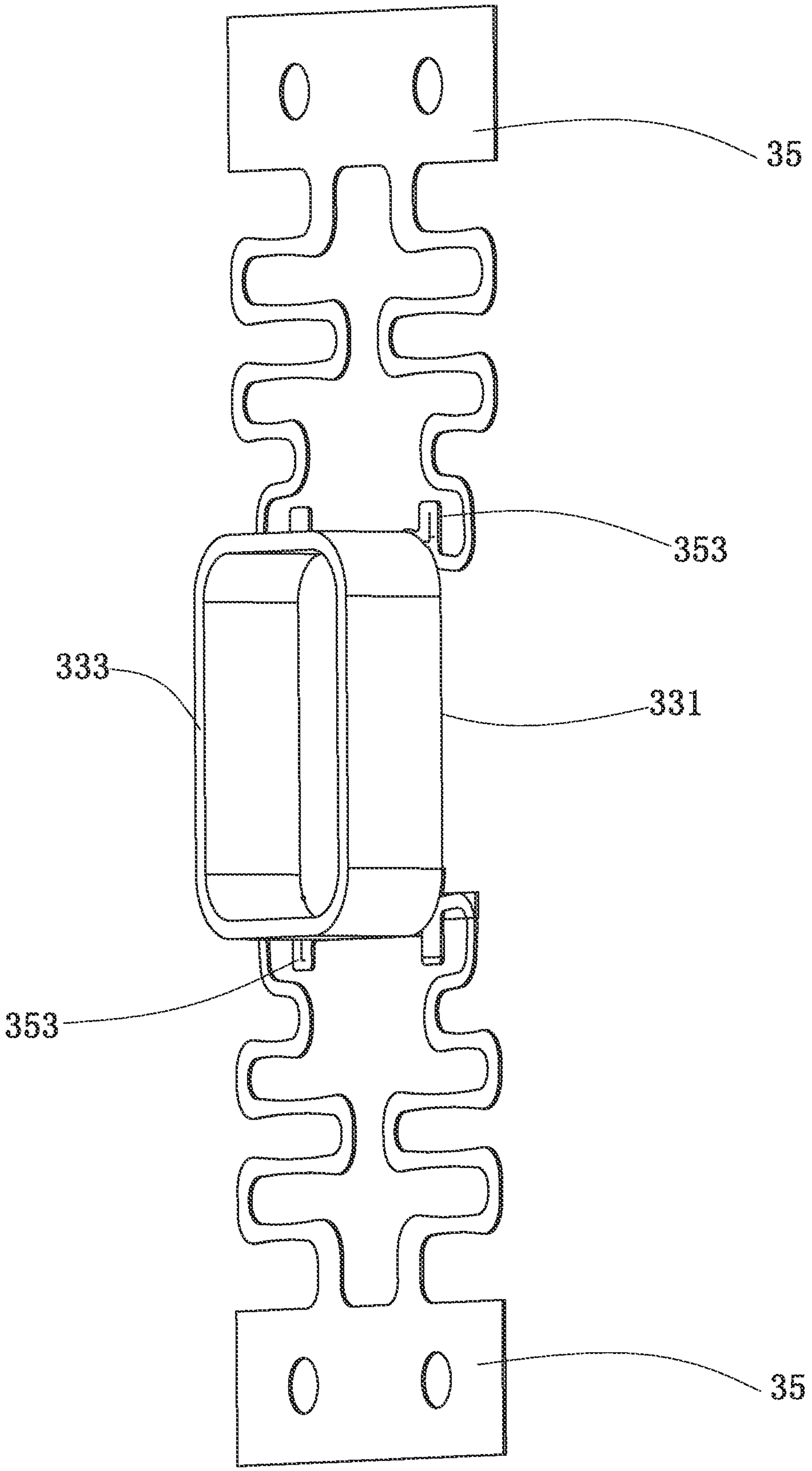
FIG. 9 is an isometric view of a voice coil and the metal shrapnel after being assembled in the sounding device.

Referring to the FIGS. 1, 7 and 9, the first surface 331 is a surface of the voice coil 33 away from the diaphragm 31, and the second surface 333 is a surface of the voice coil 33 facing the diaphragm 31, the second surface 333 is fixed to the diaphragm 31 via a skeleton 37. Further, the second surface 333 is fixed to the dome 311 of the diaphragm 31 via the skeleton 37.

It can be understood that, in other embodiments, the second surface 333 of the voice coil 33 could directly be fixed to the diaphragm 31, and there is no need to provide the skeleton. Compared with the voice coil 33 directly fixed on the diaphragm 31, the diaphragm 31 and the voice coil 33 are connected through the skeleton 37, which can reduce the size of the voice coil 33 in the vibration direction on the basis of ensuring the sound effect, so that the cost of the voice coil 33 can be saved and the energy consumption caused by the resistance of the voice coil 33 can be reduced. Optionally, the first surface 331 is the surface of the voice coil 33 facing to the diaphragm 31, accordingly, the second surface 333 is the surface of the voice coil 33 away from the diaphragm 31, and the first surface 331 is sequentially fixedly connected to the diaphragm 31 via the metal shrapnel 35 and the frame 37, the lead wire 330 of the voice coil 33 is drawn from the first surface 331 and then passes through a gap between the first surface 331 and the skeleton 37 for being electrically connected to the metal shrapnel 35; optionally, the first surface 331 is the surface of the voice coil 33 facing to the diaphragm 31, accordingly, the second surface 333 is the surface of the voice coil 33 away from the diaphragm 31, the first surface 331 could be fixedly connected to the diaphragm 31 via the metal shrapnel 35, and there is no need to provide the skeleton, the lead wire 330 of the voice coil 33 is drawn from the first surface 331 and then passes through the gap between the first surface 331 and the diaphragm 31 for being electrically connected to the metal shrapnel 35.

The metal shrapnel 35 includes a first connecting portion 351 fixedly connected to the voice coil 33, a welding portion 353 extending from the first connecting portion 351 and electrically connected to the lead wire 330 of the voice coil 33, a second connecting portion 355 apart from the first connecting portion 351 and fixed to the frame 1, and an elastic arm 357 connecting the first connecting portion 351 and the second connection portion 355. Further, the first connecting portion 351 is fixedly connected to the first surface 331 of the voice coil 33, the second connecting portion 355 is electrically connected to the external circuit.

Figure 2:
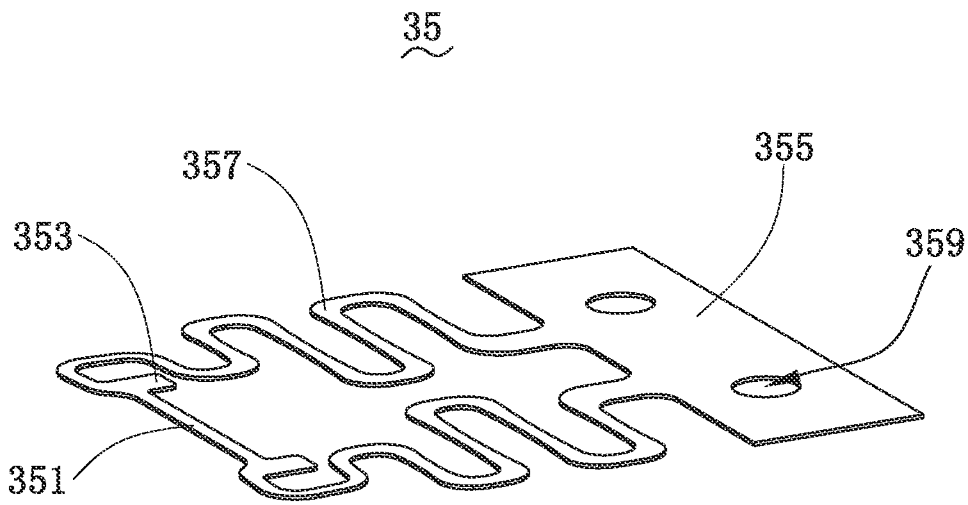
FIG. 2 is an isometric view of a metal shrapnel of the sounding device in FIG. 1.

Referring to the FIG. 2, at least two fixing holes 359 are provided through the second connecting portion 355, and fixing posts 1A passing through the fixing holes 359 are provided on the frame 1.

Referring to the FIG. 6, a position of the frame 1 corresponding to the second connecting portion 355 is penetrated with a window 1B that partially exposes the second connecting portion 355, and the second connecting portion 355 is electrically connected to the external circuit through the window 1B. Thus, the second connection portion 355 can be directly electrically connected to the external circuit, thereby avoiding injection molding on the frame 1 to electrically connect the second connection portion 355 and a terminal board of the external circuit.

The magnetic circuit system 5 includes a yoke 53 fixed to the frame 1.

The yoke 53 further includes a bottom wall 531 fixed to the magnetic part 51, a side wall 533 extending from an edge of the bottom wall 531 toward the diaphragm 31, a magnetic gap 5A is formed by the magnetic part 51 and the side wall 533 for receiving the voice coil 33 and the skeleton 37, a gap 535 is formed on the side wall 533 for avoiding the welding portion 353 and the elastic arm 357. In addition, the yoke 53 is made of a magnetically conductive material, so that the magnetic flux in the magnetic gap 5A can be enhanced.

Figure 3:
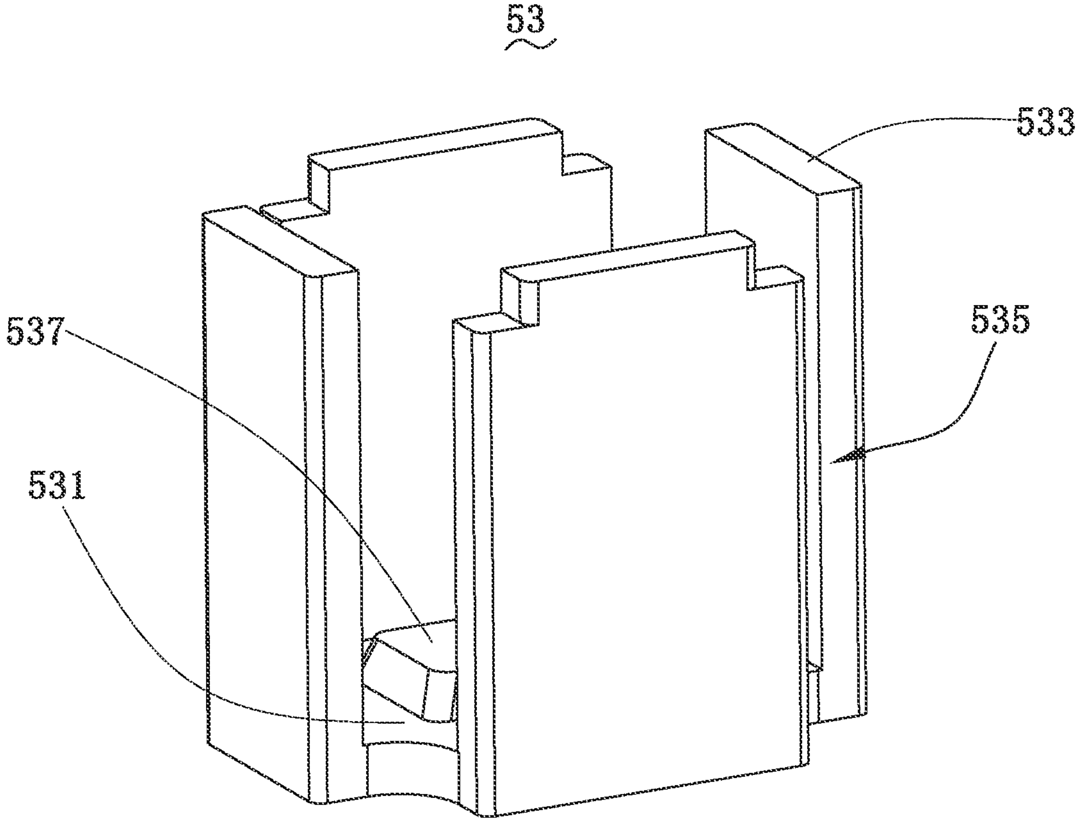
FIG. 3 is an isometric view of a yoke of the sounding device in FIG. 1.
Figure 4:
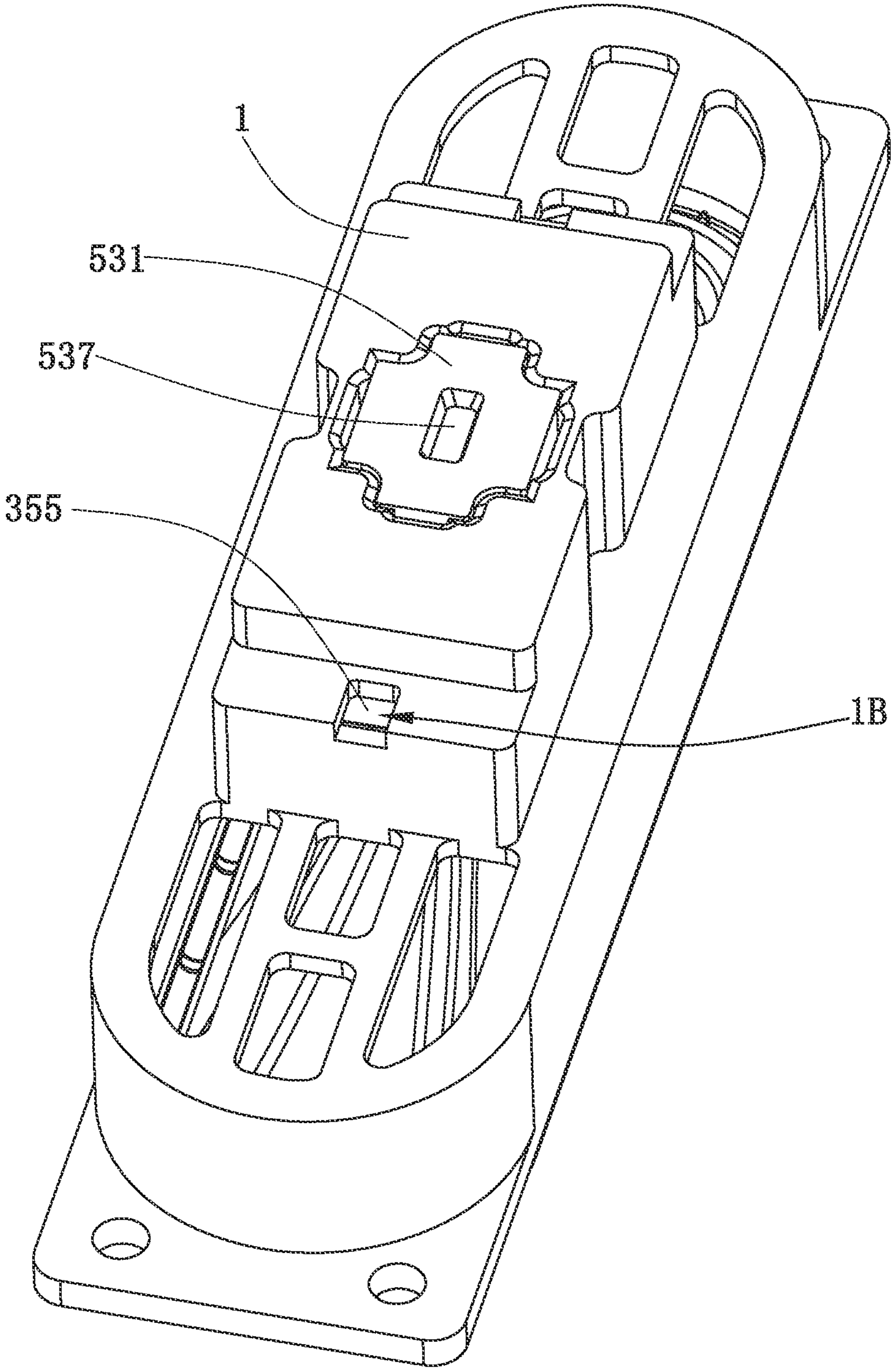
FIG. 4 is an isometric view of the sounding device after being assembled.
Figure 5:
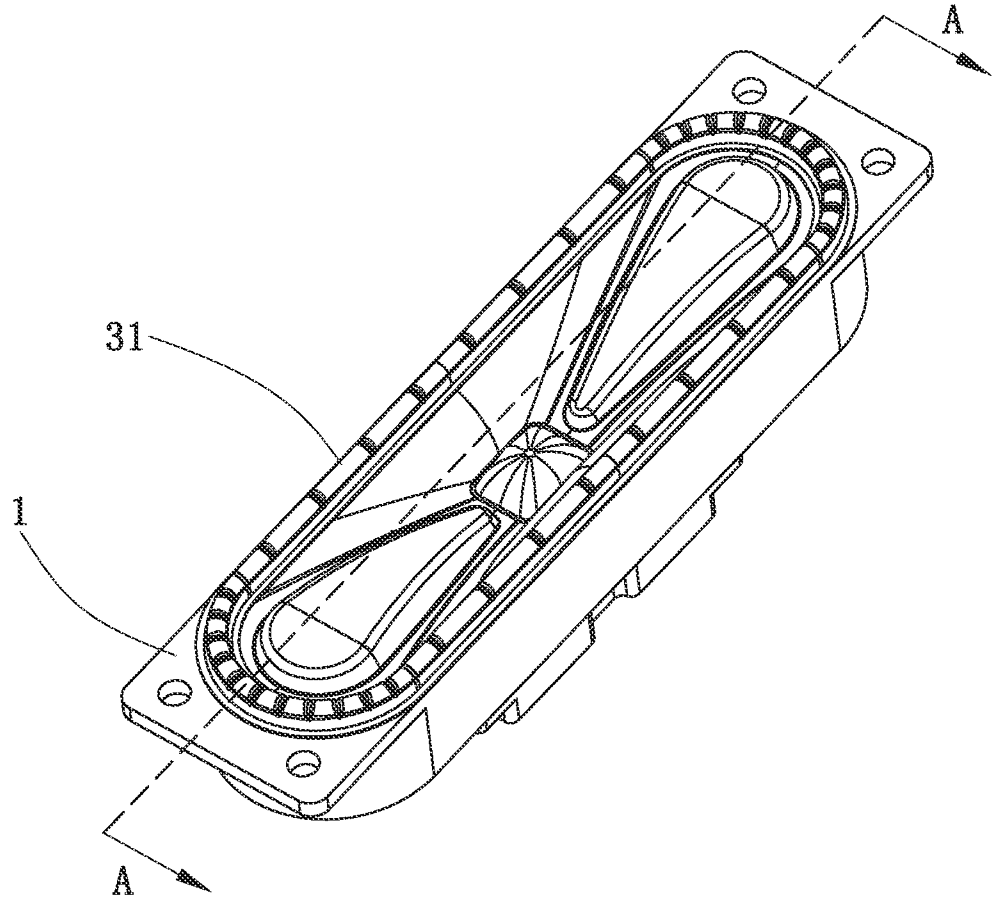
FIG. 5 is an isometric view of the sounding device in FIG. 4, from another aspect.
Figure 8:
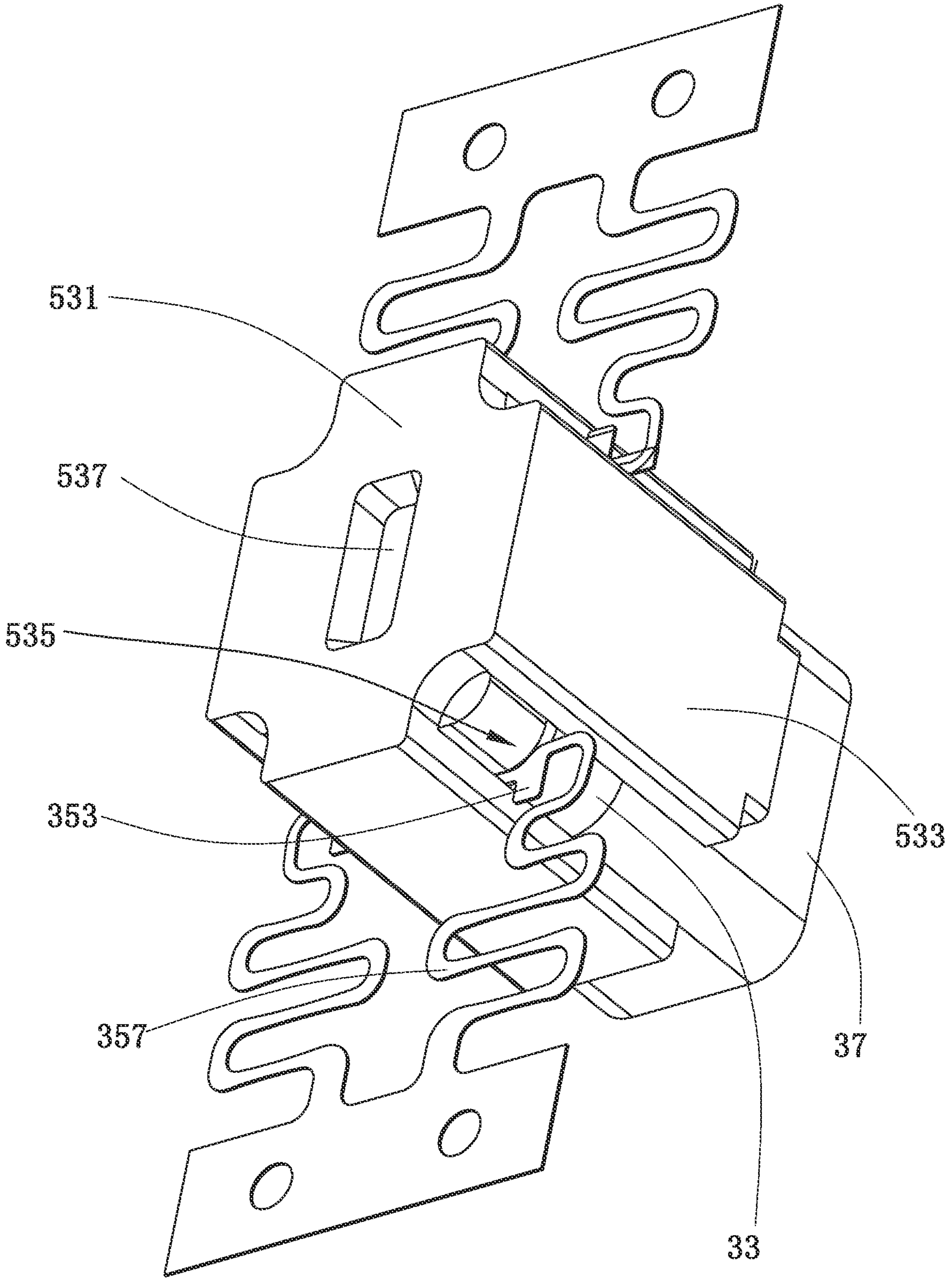
FIG. 8 is an isometric view of the sounding device after its partial structure being assembled.

Referring to the FIGS. 3 and 8, the gap 535 is located at a chamfer, and the gap 535 separates the side wall 533 into mutually independent parts. Thus the yoke 53 can be formed by bending a plate-shaped soft magnetic material, thereby facilitating the processing of the yoke 53.

Referring to the FIG. 7, the bottom wall 531 protrudes toward the diaphragm 33 for forming a protruding part 537, the magnetic part 51 is fixed on the protruding part 537, and an orthographic projection of the protruding part 537 on the magnetic part 51 is located within a range of the magnetic part 51. Thus, the voice coil 33 has a larger stroke space during the vibration process, so as to prevent the voice coil 33 from colliding with the bottom wall 531 of the yoke 53 during the vibration process.

Referring to the FIGS. 1 and 7, the magnetic part 51 includes a first magnet 511 fixed on the bottom wall 531, a first pole plate 513 stacked on a side of the first magnet 511 away from the bottom wall 531, a second magnet 515 stacked on a side of the first pole plate 513 away from the first magnet 511, and a second pole plate 517 stacked on a side of the second magnet 515 away from the first magnet 511.

Further, the first magnet 511 and the second magnet 515 may be natural magnets or artificial magnets (for example, permanent magnet). The first pole plate 513 and the second pole plate 517 are made of magnetically conductive material, so that the magnetic flux in the magnetic gap 5A can be enhanced.

It can be understood that the structure of the magnetic part 51 is not limited to this. For example, the magnetic part 51 only includes a magnet fixed to the bottom wall 531; optionally, the magnetic part 51 only includes a magnet fixed to the bottom wall 531 and a pole plate stacked on a side of the magnet away from the bottom wall 531; optionally, the magnetic part 51 is formed by superimposing at least three magnets and at least three pole plates.

It is to be understood, however, that even though numerous characteristics and advantages of the embodiments have been set forth in the foregoing description, together with details of the structures and functions of the embodiments, the disclosure is illustrative only, and changes may be made in detail, especially in matters of shape, size, and arrangement of parts within the principles of the disclosure to the full extent indicated by the broad general meaning of the terms where the appended claims are expressed.

What is claimed is:

1. A sounding device, comprising:

a frame;

a magnetic circuit system fixed to the frame and including a magnetic part; and a vibration system fixed to the frame, comprising:

a diaphragm fixed to the frame;

a voice coil driving the diaphragm to vibrate and arranged around the magnetic part, the voice coil including a lead wire; and a metal shrapnel with conduction, one end of the metal shrapnel fixed to the frame and electrically connected to an external circuit, and the other end of the metal shrapnel fixed to the voice coil and electrically connected to the lead wire of the voice coil; wherein the number of the metal shrapnel is two, the two shrapnels are located on two opposite sides of the magnetic part, the metal shrapnel restrains a movement of the voice coil in a direction perpendicular to a vibration direction of the diaphragm, wherein the metal shrapnel comprises a first connecting portion fixedly connected to the voice coil, a welding portion extending from the first connecting portion and electrically connected to the lead wire of the voice coil, a second connecting portion apart from the first connecting portion and fixed to the frame, and an elastic arm connecting the first connecting portion and the second connection portion, the second connecting portion is electrically connected to the external circuit.

2. The sounding device as described in claim 1, wherein the voice coil comprises a first surface fixedly connected to the first connecting portion and a second surface opposite to the first surface, the first surface and the second surface are spaced apart along the vibration direction of the diaphragm.

3. The sounding device as described in claim 2, wherein the lead wire of the voice coil is led out from the first surface.

4. The sounding device as described in claim 2, wherein the second surface is fixedly connected to the diaphragm via a skeleton.

5. The sounding device as described in claim 1, wherein at least two fixing holes are provided through the second connecting portion, and fixing posts passing through the fixing holes are provided on the frame.

6. The sounding device as described in claim 1, wherein a position of the frame corresponding to the second connecting portion is penetrated with a window that partially exposes the second connecting portion, and the second connecting portion is electrically connected to the external circuit through the window.

7. The sounding device as described in claim 1, wherein the magnetic circuit system comprises a yoke fixed to the frame, the yoke comprises s bottom wall fixed to the magnetic part, a side wall extending from an edge of the bottom wall toward the diaphragm, a magnetic gap is formed by the magnetic part and the side wall for receiving the voice coil, a gap is formed on the side wall for avoiding the welding portion and the elastic arm.

8. The sounding device as described in claim 7, wherein the bottom wall protrudes toward the diaphragm for forming a protruding part, the magnetic part is fixed on the protruding part, and an orthographic projection of the protruding part on the magnetic part is located within a range of the magnetic part.

9. The sounding device as described in claim 7, wherein the magnetic part comprises a first magnet fixed on the bottom wall, a first pole plate stacked on a side of the first magnet away from the bottom wall, a second magnet stacked on a side of the first pole plate away from the first magnet, and a second pole plate stacked on a side of the second magnet away from the first magnet.

* * * * *